Feb. 26, 1924.
M. C. GUNTER
1,485,028
COMBINATION SALT AND PEPPER DEVICE
Filed May 1, 1923
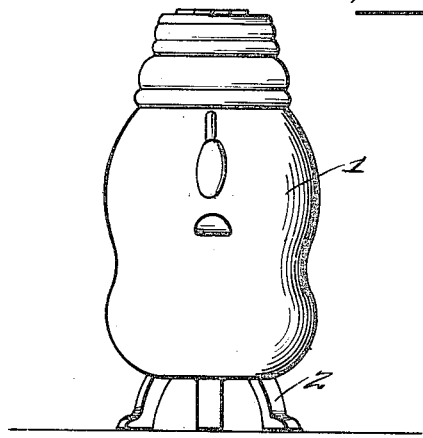
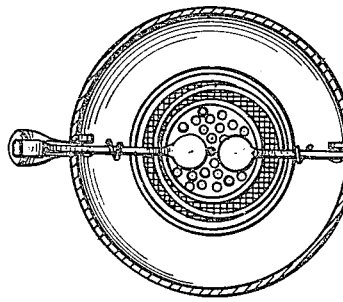
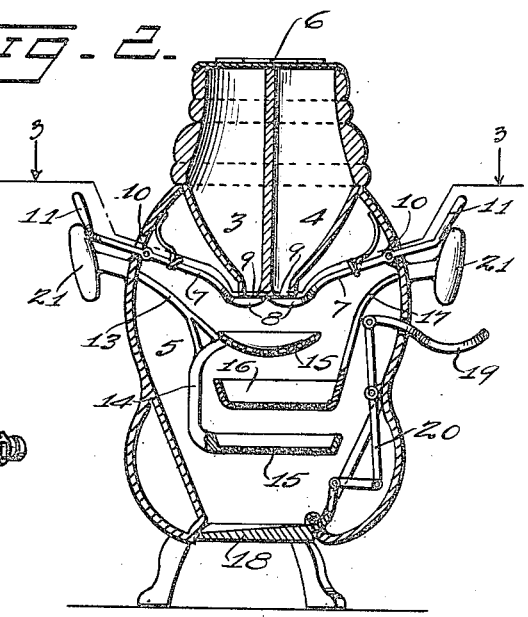
Inventor
May Christiena Gunter
By
Attorney Patented Feb. 26, 1924.

1,485,028

UNITED STATES PATENT OFFICE.

MAY CHRISTIENA GUNTER, OF NEW YORK, N. Y.

COMBINATION SALT AND PEPPER DEVICE.

Application filed May 1, 1923. Serial No. 635,931.

*To all whom it may concern:*

Be it known that I, MAY C. GUNTER, a citizen of Jamaica, British West Indies, residing at New York, in the county of New York and State of New York, have invented certain new and useful Improvements in a Combination Salt and Pepper Device, of which the following is a specification.

This invention relates to improvements in condiment holders and has for its primary object to provide a holder whereby the salt and pepper may be readily dispensed from the holder without shaking same as is usually required.

A further object of the invention is to provide a condiment holder whereby the salt and pepper may be thoroughly mixed before discharging same from the holder.

A still further object of the invention is to provide a condiment holder of the above indicated character, whereby the contents of the holder may be accurately measured, thoroughly mixed and dispensed through the bottom of the holder without the usual shaking of same.

And a still further object of my invention is to provide a holder of the above indicated character, which is light in weight, simple in construction and operation, and one that can be manufactured and sold at a relatively low cost.

These and like objects of the invention will be better understood as the description follows and as is specifically pointed out in the appended claim.

Referring to the accompanying drawings which form a part of this specification,

Figure 1 is a side elevation of a condiment holder constructed in accordance with my invention.

Figure 2 is a vertical section through same.

Figure 3 is a horizontal section taken on line 3—3 of Figure 2, looking in the direction of the arrows.

Referring to the accompanying drawings in detail, like characters will be used to indicate like parts in the different views.

In the drawings, numeral 1 indicates a condiment holder constructed of any suitable material and any desired shape, which is adapted to be supported on legs 2. The interior of the holder is divided into compartments 3, 4 and 5. The compartments 3 and 4 are adapted to hold salt and pepper separately and the compartments are filled to the top by removing the cap 6. A lever 7, of which there are 2, extend to opposite sides of the holder 1 and the inner end of each lever is provided with a spoonlike cup 8. The cups 8 are adapted to be positioned under the outlet 9 of the salt and pepper compartments. The levers 7 are pivotally connected to the inner side of the container at a point where same extends to the wall, as indicated by the numeral 10, and each of the levers is provided on the extreme outer end with a thumb grip 11. A spring 12, of which there is one used in connection with each lever, has one end connected to the inner wall of the holder at a point above the pivotal connection 10 of the lever, and the opposite end of the spring engages the lever, between the pivotal connection and the spoonlike cup 8. The spring 12 normally holds the cup against the opening 9 of the salt and pepper compartment, thus keeping same closed.

An arm 13 is attached to the inner side of the holder at a point below one of the pivotal connections 10, and a U-shaped branch 14 is formed on the lower end of the arm 13. Sifters 15, which can be of any desired construction, are supported by the U-shaped branch 14, and a sifter 15 which is simple in construction, supported by an arm 17 at a point between the sifters 15.

When designed to use my improved condiment holder the thumb pieces 11 are pressed inwardly toward the holder, which holds the spoonlike members 8 out of engagement with the inside opening of the salt and pepper compartments, allowing the salt and pepper to pass through the sifters 15 and 16 causing same to be thoroughly mixed during the passage thereto, allowing the thoroughly mixed salt and pepper to finally rest on top of a hingedly connected trap door 18, which is adapted to be opened by a lever 19 through a link 20. The side of the condiment holder, at a point below the thumb pieces 11, is provided with sifting means 21 whereby the holder may be readily lifted and positioned above the food about to be seasoned, by operating the lever 19 for opening the trap door 18.

In view of the foregoing description of my invention in connection with the accompanying drawings, it is thought that any further explanation as to the construction, operation and objects of the invention are unnecessary.

While I have shown and described the preferred form of my invention, I realize that various minor changes may be resorted to, without departing from the spirit and scope of my invention as claimed; therefore, I do not wish to limit myself to the exact details of construction shown, nor to the combination and arrangement of parts.

What I claim as new and desire to secure by Letters Patent is:

In a condiment holder, comprising a body having salt and pepper compartments therein, means for normally closing the discharge from said compartments, means for opening discharge from said compartment, a series of sifters positioned below the discharge opening of said compartments for mixing the salt and pepper during passage therethrough, a trap door positioned in the bottom of said holder, and means for opening said trap door to discharge the mixed salt and pepper therefrom.

In testimony whereof, I have affixed my signature in the presence of two witnesses.

MAY CHRISTIENA GUNTER.

Witnesses:
ROBERT GUNTER,
AGNES BLACKWOOD.